United States Patent
Zhao

(10) Patent No.: US 9,792,700 B2
(45) Date of Patent: Oct. 17, 2017

(54) METHOD AND DEVICE FOR PROCESSING VIRTUAL FITTING MODEL IMAGE

(71) Applicant: BEIJING JINGDONG SHANGKE INFORMATION TECHNOLOGY CO, LTD., Haidian District, Beijing (CN)

(72) Inventor: Gang Zhao, Beijing (CN)

(73) Assignee: BEIJING JINGDONG SHANGKE INFORMATION TECHNOLOGY CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/913,198

(22) PCT Filed: May 9, 2014

(86) PCT No.: PCT/CN2014/077189
§ 371 (c)(1),
(2) Date: Feb. 19, 2016

(87) PCT Pub. No.: WO2015/024397
PCT Pub. Date: Feb. 26, 2015

(65) Prior Publication Data
US 2016/0196668 A1    Jul. 7, 2016

(30) Foreign Application Priority Data
Aug. 19, 2013    (CN) .......................... 2013 1 0361579

(51) Int. Cl.
*G06T 7/40*    (2017.01)
*G06T 11/00*    (2006.01)
(Continued)

(52) U.S. Cl.
CPC ................ *G06T 7/408* (2013.01); *G06T 7/90* (2017.01); *G06T 11/001* (2013.01); *G06T 19/20* (2013.01);
(Continued)

(58) Field of Classification Search
CPC combination set(s) only.
See application file for complete search history.

(56) References Cited

U.S. PATENT DOCUMENTS

2006/0088209 A1    4/2006    Yu et al.
2010/0030578 A1*   2/2010    Siddique ............ G06Q 10/0637
                                                    705/3
(Continued)

FOREIGN PATENT DOCUMENTS

CN    101996314    3/2011
CN    102509349    6/2012
(Continued)

OTHER PUBLICATIONS

International Search Report for Application No. PCT/CN2014/077189 dated Aug. 14, 2014 (4 pages).

*Primary Examiner* — Wesner Sajous
(74) *Attorney, Agent, or Firm* — Michael Best & Friedrich LLP

(57) ABSTRACT

Provided in the present invention are a method and device for processing a virtual fitting model image, which help enable the fitting effect of a virtual fitting model to better approximate the fitting effect of a user. The method comprises: determining a human body skin color average value of a pre-selected area in a reference image, and calculating a ratio by dividing the human body skin color average value by a skin color average value of the virtual fitting model image; multiplying the various pixel values of the body area in the virtual fitting model image by the ratio, and using the
(Continued)

results of multiplication as the various pixel values of the body area in the virtual fitting model image.

19 Claims, 3 Drawing Sheets

(51) Int. Cl.
  *G06T 19/20* (2011.01)
  *G06T 7/90* (2017.01)
(52) U.S. Cl.
  CPC *G06T 2207/30196* (2013.01); *G06T 2210/16* (2013.01); *G06T 2215/16* (2013.01); *G06T 2219/2004* (2013.01); *G06T 2219/2012* (2013.01)

(56) References Cited

U.S. PATENT DOCUMENTS

| | | | | |
|---|---|---|---|---|
| 2013/0215116 A1* | 8/2013 | Siddique | ............ | G06Q 30/0643 |
| | | | | 345/420 |
| 2014/0176565 A1* | 6/2014 | Adeyoola | ............. | G06T 19/006 |
| | | | | 345/473 |
| 2015/0154691 A1* | 6/2015 | Curry | ................ | G06Q 30/0643 |
| | | | | 705/27.2 |
| 2016/0210602 A1* | 7/2016 | Siddique | ............ | G06Q 20/0453 |

FOREIGN PATENT DOCUMENTS

| | | |
|---|---|---|
| CN | 102842089 | 12/2012 |
| CN | 103456032 | 12/2013 |
| WO | 2010124080 | 10/2010 |

\* cited by examiner

METHOD AND DEVICE FOR PROCESSING VIRTUAL FITTING MODEL IMAGE

TECHNICAL FIELD

The present invention relates to a method and a device for processing an image of a virtual fitting model.

BACKGROUND ART

Virtual fitting directs to facilitate purchase of suitable apparel by utilizing a computer technology which can provide a reference for the user when he/she intends to buy a garment sold online. In particular, with the computer technology used in the field of virtual fitting, a garment sold online can be tried on a virtual fitting model rather than a real person, and a view of the model with the garment fitted on can be presented.

The current virtual fitting solution mainly uses virtual fitting models stored in a graph library. From the graph library, a user can select a virtual fitting model and an article of clothing, so that the user may pick up clothes based on the appearance of the model with the clothes fitted on the model.

SUMMARY OF THE INVENTION

The present invention provides a method and a device for processing an image of virtual fitting model, which are helpful to making the fitting appearance of the virtual fitting model to be closer to that of the user's own.

To reach the above object, according to one aspect of the present invention, a method for processing an image of a virtual fitting model is provided.

The method for processing an image of a virtual fitting model in the present invention comprises: determining an average value of skin tones of a human body in a pre-selected region of a reference image, and then calculating a ratio which is obtained from dividing the average value of skin tones of the human body by an average value of skin tones of an image of virtual fitting model; multiplying each one of pixel values of a body region in the image of the virtual fitting model by said ratio, and taking the results of the multiplication as pixel values of the body region in the image of the virtual fitting model.

Optionally, the pre-selected region is a facial region; the step of determining an average value of skin tones of a human body in a pre-selected region of a reference image comprises: determining a set of pixels of which colors fall within the skin tone range in the facial region; taking an average value of colors of all pixels in the set of pixels, as the average value of skin tones of human body in the pre-selected region of the reference image.

Optionally, the pixels of which colors fall within the skin tone range in the facial region are determined according to the following conditions: $Y>0.35$, $R>0.39 G>0.15$, $B>0.09$, $V1-V2>0.07$, $R/G<1.8$, $R/B<3.0$, $G/B<3.0$, $R>G$ and $R>B$, wherein $Y=R\times0.299+G\times0.587+B\times0.114$, $V1=\max(R,G,B)$, $V2=\min(R,G,B)$; R, G and B represent values of red, green and blue components of each pixel.

Optionally, before the step of calculating a ratio which is obtained from dividing the average value of skin tones of the human body by the average value of skin tones of the image of virtual fitting model, the method further comprises: calculating an average value of skin tones of the image of the virtual fitting model.

Optionally, before the step of determining an average value of skin tones of the human body in a pre-selected region of a reference image, the method further comprises: receiving information about determining the pre-selected region in the reference image According to another aspect of the present invention, a device for processing an image of virtual fitting model is provided.

The device for processing an image of virtual fitting model in the present invention comprises: a first calculation module configured to determine an average value of skin tones of a human body in a pre-selected region of a reference image; a second calculation module configured to calculate a ratio which is obtained from dividing the average value of skin tones of the human body by an average value of skin tones of an image of a virtual fitting model; a third calculation module configured to multiply each one of pixel values of a body region in the image of the virtual fitting model by said ratio; an output module configured to output the processed image of the virtual fitting model, wherein the pixel values of the body region in the image of virtual fitting model are results of the multiplication performed by the third calculation module.

Optionally, the first calculation module is further configured to determine a set of pixels of which colors fall within the skin tone range in the facial region; take an average value of colors of all pixels in the set of pixels, as the average value of skin tones of human body in the pre-selected region of the reference image.

Optionally, the first calculation module is further configured to determine pixels of which colors fall within the skin tone range in the facial region according to the following conditions: $Y>0.35$, $R>0.39 G>0.15$, $B>0.09$, $V1-V2>0.07$, $R/G<1.8$, $R/B<3.0$, $G/B<3.0$, $R>G$ and $R>B$, wherein $Y=R\times0.299+G\times0.587+B\times0.114$, $V1=\max(R,G,B)$, $V2=\min(R,G,B)$; R, G and B represent values of red, green and blue components of each pixel.

Optionally, the first calculation module is further configured to calculate an average value of skin tones of the image of the virtual fitting model.

Optionally, the device further comprises a receiving module configured to receive information about determining the pre-selected region in the reference image.

According to the technical solution of the present invention, the color of a body region of an image of virtual fitting model can be adjusted based on the color of an image of human face or body provided by the user, such that the skin tone of the virtual fitting model is close to that of the user herself/himself and the fitting effect of the virtual fitting model is closer to that of the user herself/himself.

BRIEF DESCRIPTION OF THE DRAWINGS

Figures are provided for better understanding of the present invention, and are not intended to be limiting, wherein.

DESCRIPTION OF THE EMBODIMENTS

The detailed description is set forth below in connection with the appended drawings wherein various details of embodiments of the present invention are included in order to contribute to the understanding of the invention, but merely can be considered as exemplary aspects. Hence, persons skilled in the art should realize that various changes and modifications to the embodiments described herein can be made without departing from the spirit or scope of the invention. Similarly, for the sake of clarification and simplicity of description, explanations on the commonly known functions and structures are omitted in the following descriptions.

Figure 1:
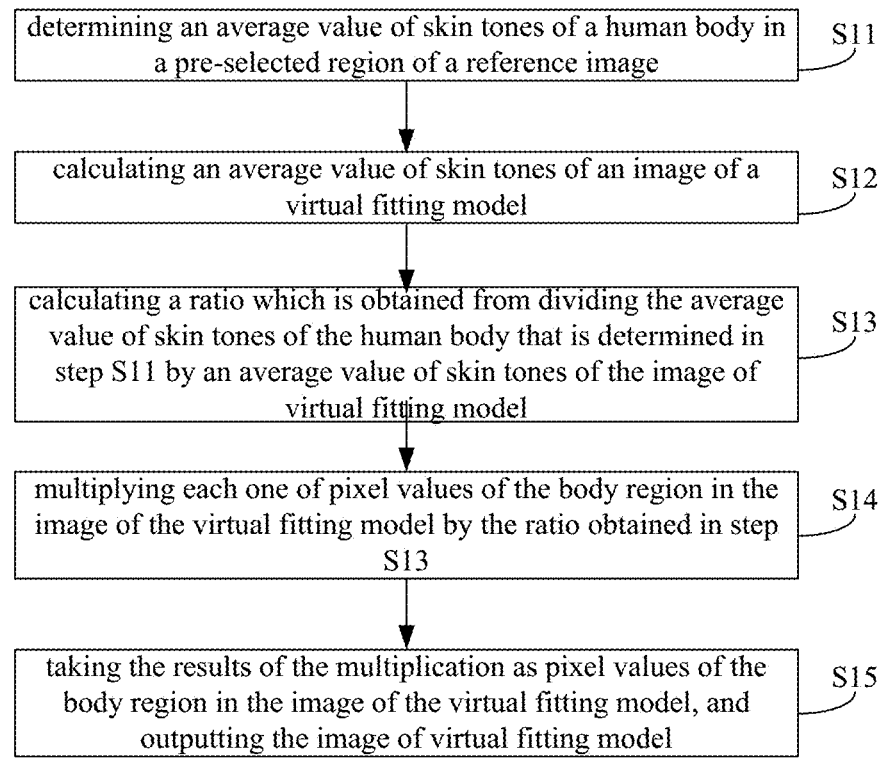
FIG. 1 is a diagram of main steps of a method for processing images of a virtual fitting model according to an embodiment of the present invention.

FIG. 1 is a diagram of main steps of a method for processing images of a virtual fitting model according to an embodiment of the present invention. As illustrated in FIG. 1, the method can be executed by a server related to electronic business, and mainly includes the following steps:

Step S11: determining an average value of skin tones of a human body in a pre-selected region of a reference image. The reference image is generally a picture of the user himself/herself or a part cutout from the picture which can be a piece of skin region of the human image. Generally, the reference image is provided to the server by a user via a terminal device, such as personal computer.

Figure 2:
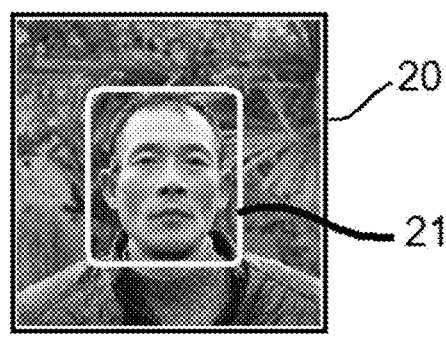
FIG. 2 is a diagram of a face region circled in a picture according to an embodiment of the present invention.

If the reference image is a picture of a human face, a user may need to select the face region in the picture due to colors of some pixels in the background being close to the skin. Accordingly, the picture uploaded to the server should be the one in which the face region has been selected, for example, as shown in FIG. 2 which is a diagram of a face region circled in a picture according to an embodiment of the present invention. The user circles the face range 21 in picture 20 and then uploads the picture 20 to the server.

Figure 3:
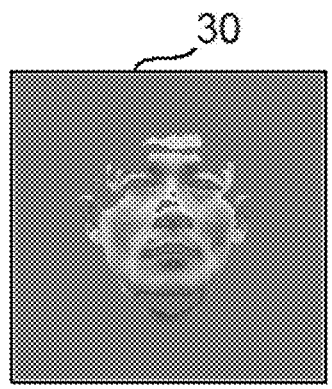
FIG. 3 is a diagram of pixels in a human face image that fall into a skin tone range, related to an embodiment of the present invention.

FIG. 3 is a diagram of pixels of a human face image falling into a skin tone range relating to an embodiment of the present invention. Referring to FIG. 3, due to the presence of five facial features (i.e. mouth, nose, ears, eyes and eyebrows), not all of a human face is skin. That is, only a part of pixels of face image 30 belong to the pixels in the skin tone range. Hence, there is a need to determine a set of pixels of which colors fall within the skin tone range in the facial region, and then take an average value of colors of all pixels in the set as the average value of skin tones of human body in the pre-selected region of the reference image. The average value of the skin tone of the pixels in the set can be calculated according to the following formulae:

$$R_{avg}=(\Sigma^N R)/N$$

$$G_{avg}=(\Sigma^N G)/N$$

$$B_{avg}=(\Sigma^N B)/N$$

In the formulae, R, G and B represent values of red, green and blue components of the pixels in the set respectively; $R_{avg}$, $G_{avg}$ and $B_{avg}$ represent average values of red components, green components and blue components of the pixels in the set respectively; N represents the number of the pixels in the set.

It can be determined based on the following conditions whether or not colors of the pixels in the image belong to the pixels in the skin tone range, i.e., which pixels belong to the aforesaid set:

Y>0.35, R>0.39 G>0.15, B>0.09, V1−V2>0.07, R/G<1.8, R/B<3.0, G/B<3.0, R>G and R>B, wherein Y=R×0.299+G×0.587+B×0.114, V1=max(R,G,B), V2=min(R,G,B);

R, G and B represent values of red, green and blue components of the pixels.

As described above, the reference image may be a part of the picture cutout by the user, the part is a skin region of the human image. Here, the aforesaid pre-selected region may be small continuous or non-continuous regions selected by the server on the skin region, and not to be calculated according to all the regions cutout by the user, in order to to save time for calculating.

Step S12: calculating an average value of skin tone of the image of virtual fitting model. If the average value of skin tones of various images in a graph library of the virtual fitting models has been recorded in the server, this step can be omitted. The manner for calculating the average value of skin tones is similar to that of calculating the average value of skin tones of the pixels in the aforesaid set. However, it should take the pixels of the image of virtual fitting model that fall into the skin tone range as elements of the set here.

Step S13: calculating the ratio which is obtained from dividing the average value of skin tones of the human body that is determined in step S11 by an average value of skin tones of an image of virtual fitting model.

Step S14: multiplying each one of pixel values of the body region in the image of virtual fitting model by the ratio obtained in Step S13. The calculation in this step obtains the adjusted value of the color of each of the pixels of the body region in the image of virtual fitting model, Step S15: taking the results of the multiplication as pixel values of the body region in the image of the virtual fitting model, and outputting the processed image of virtual fitting model, wherein in the output image of virtual fitting model, each pixel values of the body region should be values adjusted in Step S14.

For example, the reference image is the picture of a human face:

In Step S13, specifically, the aforesaid ratio can be calculated according to the following formulae:

$$K_R=R_{avg\text{-}head}/R_{avg\text{-}body}$$

$$K_G=G_{avg\text{-}head}/G_{avg\text{-}body}$$

$$K_B=B_{avg\text{-}head}/B_{avg\text{-}body}$$

In Step S14, specifically, it can be calculated according to the following formulae:

$$R_{body\text{-}after}=R_{body\text{-}before}\times K_R$$

$$G_{body\text{-}after}=G_{body\text{-}before}\times K_G$$

$$B_{body\text{-}after}=B_{body\text{-}before}\times K_B$$

$R_{avg\text{-}head}$, $G_{avg\text{-}head}$ and $B_{avg\text{-}head}$ represent average values of red, green and blue components of the human body skin tone, i.e., the skin tone in an image of head, respectively, and $R_{avg\text{-}body}$, $G_{avg\text{-}body}$ and $B_{avg\text{-}body}$ represent average values of red, green and blue components of the skin tone of the image of virtual fitting model, respectively. $R_{body\text{-}before}$, $G_{body\text{-}before}$ and $B_{body\text{-}before}$ represent initial values of red, green and blue components of the skin tone of the image of virtual fitting model, respectively, and $R_{body\text{-}after}$, $G_{body\text{-}after}$ and $B_{body\text{-}after}$ are the adjusted values correspondingly.

Figure 4:
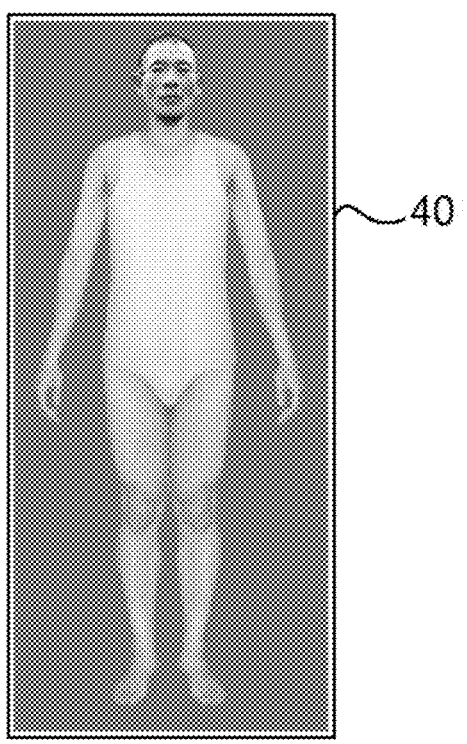
FIG. 4 is a diagram of a virtual fitting model related to an embodiment of the present invention.
Figure 5:
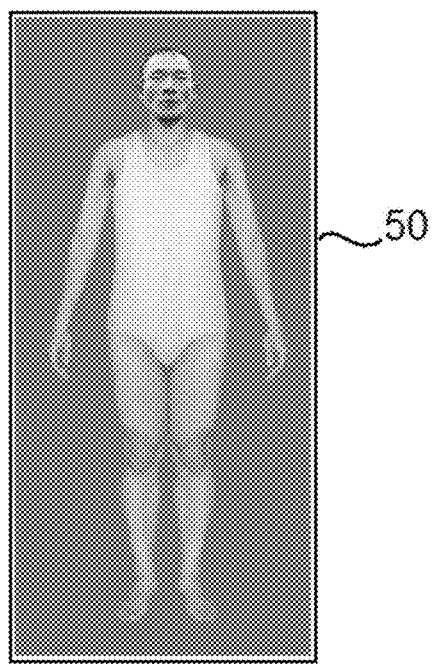
FIG. 5 is a diagram of a virtual fitting model after adjusting its skin tone according to an embodiment of the present invention.

Now the skin tone of the virtual fitting model is adjusted, so as to be closer to the skin tone provided by the user. FIG. 4 is a diagram of a virtual fitting model related to an embodiments of the present invention, and FIG. 5 is a diagram of a virtual fitting model after adjusting its skin tone according to an embodiment of the present invention. FIG. 4 and FIG. 5 both show an image of user's head. It can be seen from FIGS. 4 and 5 that, compared with the original virtual fitting model in picture 40, the skin tone of the virtual fitting model after adjusting the skin tone in picture 50 is closer to the color of the human face.

Figure 6:
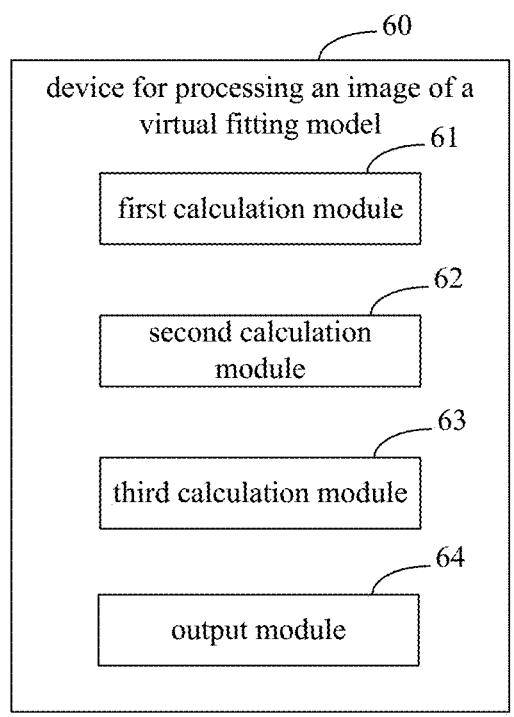
FIG. 6 is a diagram of basic components of a device for processing images of a virtual fitting model according to an embodiment of the present invention.

A device for processing an image of virtual fitting model in the embodiments of the present invention is described hereinafter. The device can be provided in the aforesaid server. Refer to FIG. 6 which is a diagram of basic components of a device for processing an image of virtual fitting model according to embodiments of the present invention). As shown in FIG. 6, a device 60 for processing an image of virtual fitting model mainly comprises a first calculation module 61, a second calculation module 62, a third calculation module 63 and an output module 64.

The first calculation module 61 is used for determining an average value of skin tones of a human body in a pre-selected region of a reference image; the second calculation module 62 is used for calculating a ratio which is obtained from dividing the average value of skin tones of the human body by an average value of skin tones of an image of a virtual fitting model; the third calculation module 63 is used for multiplying each one of pixel values of a body region in the image of virtual fitting model by the ratio; the output module 64 is used for outputting the processed image of the virtual fitting model, and the pixel values of the body region in the image of virtual fitting model are results of the multiplication performed by the third calculation module 63.

The first calculation module 61 is further used for: determining a set of pixels of which colors fall within the skin tone range in the facial region; taking an average value of colors of all pixels in the set of pixels, as the average value of skin tones of human body in the pre-selected region of the reference image.

The first calculation module 61 is further used for determining the pixels of which colors fall within the skin tone range in the facial region according to the following conditions: Y>0.35, R>0.39G>0.15, B>0.09, V1−V2>0.07, R/G<1.8, R/B<3.0, G/B<3.0, R>G and R>B, wherein Y=R×0.299+G×0.587+B×0.114, V1=max(R,G,B), V2=min(R,G,B); R, G and B represent values of red, green and blue components of each pixel.

The first calculation module 61 is further used for calculating an average value of skin tone of the image of virtual fitting model.

The device 60 for processing the image of virtual fitting model further comprises a receiving module (not shown in the figure) for receiving information about determining the pre-selected region in the reference image.

According to the technical solution in the embodiments of the present invention, the color of a body region in an image of virtual fitting model can be adjusted based on the color of an image of human face or body provided by the user, such that the skin tone of the virtual fitting model is close to that of the user herself/himself, and the fitting view of the virtual fitting model is closer to that of the user herself/himself.

The basic principle of the present invention is described by combining the aforesaid embodiments. However, those skilled in the field should understand that all or any of the steps or parts of the method and the device in the present invention can be implemented in the form of hardware, firmware, software or the combination thereof in any calculation device, including processors and storage media, or a network of the calculation device. This can be implemented by those skilled in the field using their basic programming skills after they read the explanations of the present invention.

Accordingly, the object of the present invention can also be realized by running one program or a group of programs in any calculation device which can be a commonly known universal device. Thus, the object of the present invention can also be realized by only providing a program product containing program codes that can realize the method or device. That is, such program product also constitutes the present invention, and a storage medium storing the program product constitutes the present invention, too. Obviously, the storage medium may either be any commonly known storage medium or any storage medium to be developed.

It should be pointed out that each part or step in the device and method in the present invention can be decomposed and/or re-combined apparently. These decompositions and/or re-combinations should be regarded as equivalent solutions of the present invention. Moreover, the steps of executing the aforesaid serial processing may be carried out naturally according to the explanation order and the time order, but do not absolutely need to be carried out according to the time order. Some steps can be executed in parallel or separately.

The aforesaid embodiments do not constitute restriction to the protection scope of the present invention. Those skilled in the art should understand that depending on the requirement of design and other factors, there may be various modifications, combinations, sub-combinations and replacements. Any modification, equivalent replacement, improvement and the like within the spirit and principle of the present invention should be encompassed within the protection scope of the present invention.

I claim:

1. A computer-implemented method for processing an image of virtual fitting model using a computing device, the method comprising:
    determining, with a processing device included in the computing device, an average value of skin tones of a human body in a pre-selected region of a reference image;
    calculating, with the processing device, a ratio which is obtained from dividing the average value of skin tones of the human body by an average value of skin tones of an image of a virtual fitting model;
    multiplying, with the processing device, each one of pixel values of a body region in the image of the virtual fitting model by said ratio; and
    setting, with the processing device, the pixel values of the body region in the image of the virtual fitting model to the results of the multiplication to create a modified version of the image of the virtual fitting model.

2. The method of claim 1, wherein,
    the pre-selected region is a facial region;
    the step of determining an average value of skin tones of a human body in a pre-selected region of a reference image comprising:
        determining a set of pixels of which colors fall within the skin tone range in the facial region;
        taking an average value of colors of all pixels in the set of pixels, as the average value of skin tones of human body in the pre-selected region of the reference image.

3. The method of claim 2, wherein, the pixels of which colors fall within the skin tone range in the facial region are determined according to the following conditions:

Y>0.35, R>0.39G>0.15, B>0.09, V1-V2>0.07, R/G<1.8, R/B<3.0, G/B<3.0, R>G and R>B, wherein
Y=R×0.299+G×0.587+B×0.114, V1=max(R,G,B), V2=min(R,G,B);
R, G and B represent values of red, green and blue components of each pixel.

4. The method of claim 3, wherein, before the step of calculating a ratio which is obtained from dividing the average value of skin tones of the human body by the average value of skin tones of the image of the virtual fitting model, the method further comprising calculating an average value of skin tones of the image of the virtual fitting model.

5. The method of claim 2, wherein, before the step of calculating a ratio which is obtained from dividing the average value of skin tones of the human body by the average value of skin tones of the image of the virtual fitting model, the method further comprising calculating an average value of skin tones of the image of the virtual fitting model.

6. The method of claim 1, wherein, before the step of calculating a ratio which is obtained from dividing the average value of skin tones of the human body by the average value of skin tones of the image of the virtual fitting model, the method further comprising calculating an average value of skin tones of the image of the virtual fitting model.

7. The method of claim 3, characterized in that, before the step of determining an average value of skin tones of the human body in a pre-selected region of a reference image, the method further comprising receiving information about determining the pre-selected region in the reference image.

8. The method of claim 2, characterized in that, before the step of determining an average value of skin tones of the human body in a pre-selected region of a reference image, the method further comprising receiving information about determining the pre-selected region in the reference image.

9. The method of claim 1, characterized in that, before the step of determining an average value of skin tones of the human body in a pre-selected region of a reference image, the method further comprising receiving information about determining the pre-selected region in the reference image.

10. A computing device for processing an image of virtual fitting model, characterized in that, the computing device comprising:
a processing device configured to
determine an average value of skin tones of a human body in a pre-selected region of a reference image;
calculate a ratio which is obtained from dividing the average value of skin tones of the human body by an average value of skin tones of an image of a virtual fitting model;
multiply each one of pixel values of a body region in the image of the virtual fitting model by said ratio;
set the pixel values of the body region in the image of the virtual fitting model to the results of the multiplication to generate a processed image of the virtual fitting model; and
output the processed image of the virtual fitting model.

11. The computing device of claim 10, characterized in that, the processing device is further configured to:
determine a set of pixels of which colors fall within the skin tone range in the facial region;
take an average value of colors of all pixels in the set of pixels, as the average value of skin tones of human body in the pre-selected region of the reference image.

12. The computing device of claim 11, characterized in that, the processing device is further configured to determine pixels of which colors fall within the skin tone range in the facial region according to the following conditions:
Y>0.35, R>0.39G>0.15, B>0.09, V1-V2>0.07, R/G<1.8, R/B<3.0, G/B<3.0, R>G and R>B, wherein
Y=R×0.299+G×0.587+B×0.114, V1=max(R,G,B), V2=min(R,G,B);
R, G and B represent values of red, green and blue components of each pixel.

13. The computing device of claim 12, wherein, the processing device is further configured to calculate an average value of skin tones of the image of the virtual fitting model.

14. The computing device of claim 11, wherein, the processing device is further configured to calculate an average value of skin tones of the image of the virtual fitting model.

15. The computing device of claim 10, wherein, the processing device is further configured to calculate an average value of skin tones of the image of the virtual fitting model.

16. The computing device of claim 12, wherein, the processing device is further configured to receive information about determining the pre-selected region in the reference image.

17. The computing device of claim 11, wherein, the processing device is further configured to receive information about determining the pre-selected region in the reference image.

18. The computing device of claim 10, wherein, the processing device is further configured to receive information about determining the pre-selected region in the reference image.

19. Non-transitory computer readable medium storing instructions that, when executed by a processing device included in a computing device, perform a set of functions, the set of functions comprising:
determining an average value of skin tones of a human body in a pre-selected region of a reference image;
calculating a ratio which is obtained from dividing the average value of skin tones of the human body by an average value of skin tones of an image of a virtual fitting model;
multiplying each one of pixel values of a body region in the image of the virtual fitting model by said ratio;
setting the pixel values of the body region in the image of the virtual fitting model to the results of the multiplication to create a modified version of the image of the virtual fitting model; and
outputting the modified version of the image of the virtual fitting model for display on a terminal device.

* * * * *